United States Patent
Fushimi et al.

(10) Patent No.: US 7,050,677 B2
(45) Date of Patent: May 23, 2006

(54) OPTICAL FIBER AND METHOD FOR PRODUCING THE SAME

(75) Inventors: Masahiro Fushimi, Tokyo (JP); Eiichi Ito, Tokyo (JP); Tomohiro Fujita, Saitama-ken (JP); Tadashi Minakuchi, Saitama-ken (JP); Akira Arimoto, Tokyo (JP); Mitsunori Iima, Saitama-ken (JP); Yoshimi Obara, Tokyo (JP); Shinji Tsukamoto, Saitama-ken (JP); Ryoichi Nakanishi, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 49 days.

(21) Appl. No.: 10/699,669

(22) Filed: Nov. 4, 2003

(65) Prior Publication Data

US 2004/0120646 A1   Jun. 24, 2004

(30) Foreign Application Priority Data

Nov. 5, 2002 (JP) ............................. 2002-320864
Nov. 7, 2002 (JP) ............................. 2002-323494
Nov. 12, 2002 (JP) ............................. 2002-327996

(51) Int. Cl.
G02B 6/26 (2006.01)
G02B 6/34 (2006.01)
G02B 6/42 (2006.01)
G02B 6/36 (2006.01)
G02B 6/02 (2006.01)

(52) U.S. Cl. ............................. 385/38; 385/37; 385/39; 385/76; 385/123

(58) Field of Classification Search .................. 385/38, 385/123, 127–128
See application file for complete search history.

(56) References Cited

U.S. PATENT DOCUMENTS 4,978,190 A * 12/1990 Veith ........................... 385/33
5,615,192 A    3/1997 Kikukawa et al.
5,812,727 A    9/1998 Kanazawa et al.
6,334,014 B1 * 12/2001 Nitta et al. ..................... 385/39
2004/0213515 A1 * 10/2004 Pezeshki et al. ............... 385/31
2005/0062979 A1 *  3/2005 Zhu et al. ..................... 356/480

FOREIGN PATENT DOCUMENTS

| JP | 60-246688 | 12/1985 |
|----|-----------|---------|
| JP | 61-136566 | 8/1986 |
| JP | 3-197909 | 8/1991 |
| JP | 4-502069 | 4/1992 |
| JP | 5-6564 | 1/1993 |
| JP | 5-107428 | 4/1993 |
| JP | 5-313080 | 11/1993 |
| JP | 5-333232 | 12/1993 |
| JP | 6-94947 | 4/1994 |
| JP | 7-174942 | 7/1995 |
| JP | 7-270642 | 10/1995 |
| JP | 07-339649 | * 12/1995 |
| JP | 00-46554 | 2/2000 |
| JP | 1-305382 | 10/2001 |
| JP | 2-286977 | 10/2002 |
| WO | 90/06529 | 6/1990 |

* cited by examiner

Primary Examiner—Frank G. Font
Assistant Examiner—Charlie Peng
(74) Attorney, Agent, or Firm—Greenblum & Bernstein, P.L.C.

(57) ABSTRACT

An optical fiber includes an entrance face that is optically coupleable with a device for transmitting a light beam through the optical fiber. The entrance face includes a core region and a cladding region surrounding the core region. The cladding region is at least partially covered with a coating, which is made of metal, for example. That is, the coating is formed over a whole area of the cladding region or the coating is formed on an area of the cladding region defined in a vicinity of the core region. The coating has a mirror surface to increase the reflectivity thereof and enhances the reflectivity of the entrance face.

19 Claims, 12 Drawing Sheets

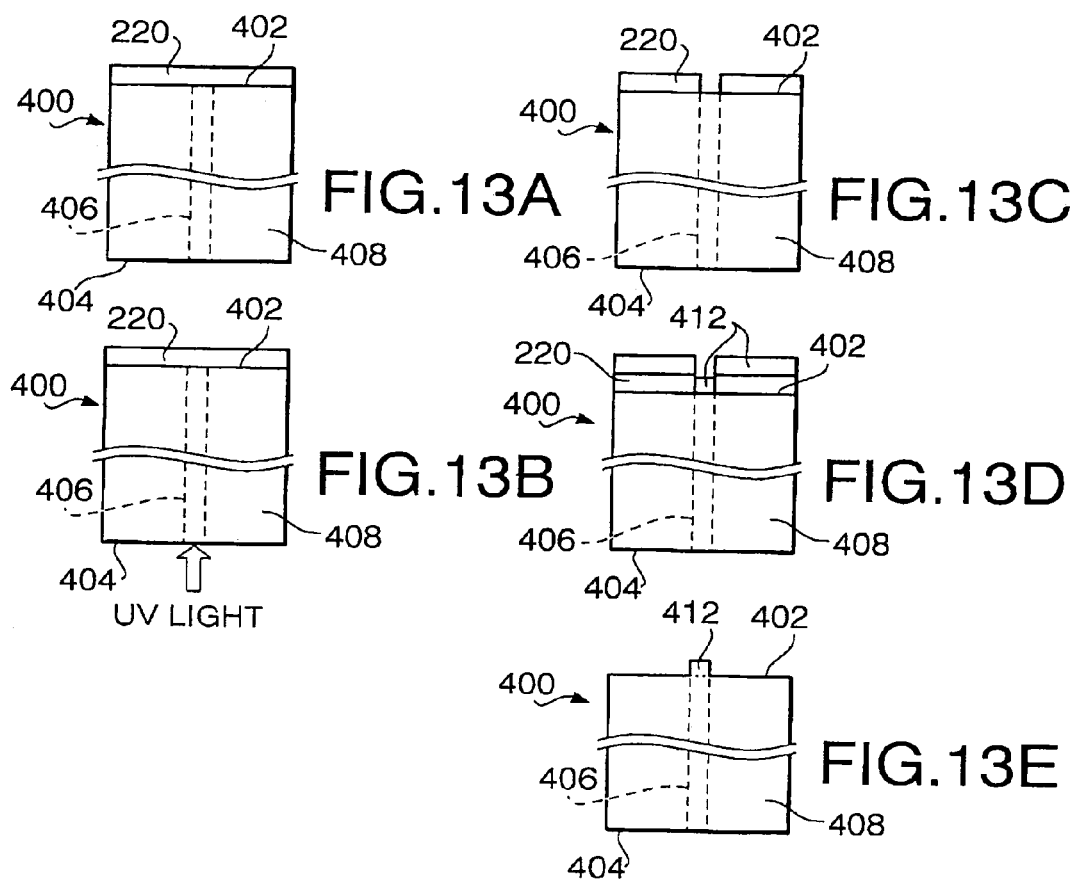

OPTICAL FIBER AND METHOD FOR PRODUCING THE SAME

BACKGROUND OF THE INVENTION

The present invention relates to an optical fiber to be optically coupled with a device for optical communication.

In an optical communication system, an optical fiber is coupled to an optical communication device, such as an optical network unit (ONU). The optical communication device generally includes a laser diode for emitting a laser beam modulated in accordance with data to be transferred and a converging lens for converging the laser beam on an entrance face of the optical fiber. In order to efficiently transmit the laser beam through the optical fiber, the laser beam should be converged on the center of the core of the optical fiber's entrance face. This requires very precise positioning of the laser diode and the converging lens against the optical fiber since the core of the optical fiber has a diameter of only a few micrometers (e.g. about 10 µm).

Conventionally, positioning of the laser diode and/or the converging lens against the optical fiber is carried out by detecting the light amount of the laser beam passed through the optical fiber. The optical fiber is moved relative to the laser beam until the detected light amount exceeds a predetermined level. When the detected light amount exceeds the predetermined level, it is determined that the laser beam emitted from the laser diode impinges on the center of the optical fiber's core.

In the conventional method mentioned above, it is necessary to first visually adjust the incident position of the laser beam to the core of the optical fiber's entrance face so that at least a part of the laser beam passes through the optical fiber. However, since it is difficult to visually distinguish the core from the cladding, the position of the laser diode relative to the optical fiber must be first adjusted by trial and error until the laser beam enters the core of the optical fiber and can be detected on the other end (exit end) of the optical fiber. This process is troublesome and time consuming.

Further, after the positioning of the laser diode and the converging lens is achieved, the positions thereof relative to the optical fiber may change with age and cause poor optical coupling between the laser diode and the optical fiber. However, after the optical fiber is installed in an optical communication system, re-adjustment of the optical coupling between the optical fiber and the laser diode cannot be carried out easily by the above-mentioned conventional method since the exit end of the optical fiber is connected to another device and does not allow measurement of the power of the laser beam emerging therefrom.

Therefore, there is a need for an optical fiber that facilitates an adjustment of a position of a light beam incident on an entrance face of the optical fiber.

There is also a need for an optical fiber of which optical coupling with a device for optical communication can be re-adjusted with ease even after the optical fiber is installed in an optical communication system.

SUMMARY OF THE INVENTION

The present invention is advantageous in that an optical fiber that satisfies the above mentioned needs and a method for producing the same are provided.

An optical fiber according to an aspect of the invention includes an entrance face that is optically coupleable with a device for transmitting a light beam through the optical fiber. The entrance face includes a core region and a cladding region surrounding the core region. The cladding region is at least partially covered with a coating, which is made of metal, for example, to enhance the reflectivity of the entrance face.

When the light beam generated by the device impinges on the cladding region of the optical fiber's entrance face, the light beam is strongly reflected by the coating thereon and allows detection of the incident position of the light beam on the optical fiber from the direction in which the reflected light beam travels. Therefore, the incident position of the light beam on the optical fiber can be adjusted with ease.

It should be noted that since it is the light beam reflected by the coating and not the light beam transmitted through the optical fiber that can be utilized for detecting the incident position of the light beam on the optical fiber, the light beam incident position can also be detected during transmission of an optical signal through the optical fiber by detecting a reflection of a signal carrying light beam. In other words, the condition of the optical coupling of the optical fiber with the device can also be detected during use of the device and the optical fiber.

Optionally, the coating may be formed substantially over a whole area of the cladding region. Alternatively, the coating may be selectively formed on an area of the cladding region defined in a vicinity of the core region.

Optionally, the coating may have a mirror surface to increase the reflectivity thereof.

In some embodiments of the invention, the entrance face is formed perpendicular to an optical axis of the optical fiber. In other embodiments of the invention, the entrance face is inclined against the optical axis of the optical fiber.

An optical fiber according to another aspect of the invention includes an entrance face that is optically coupleable with a device for transmitting a light beam through the optical fiber. The entrance face is provided with a structure that diffracts a light reflected by the entrance face.

The diffraction pattern formed by the reflected light depends on the position of the light beam incident on the entrance face of the optical fiber. Therefore, the incident position of the light beam, or the optical coupling of the optical fiber with the device, can be adjusted based on the diffraction pattern formed by the reflected light beam.

It should be noted that a light beam carrying a signal to be transmitted through the optical fiber also forms the diffraction pattern when reflected by the entrance face of the optical fiber. Therefore, the adjustment of the optical coupling between the optical fiber and the device can be performed during the use of the optical fiber.

Optionally, the entrance face is formed such that the core protrudes from the cladding and so that an end face of the core is parallel with an end face of the cladding. In particular cases, the core protrudes from the cladding by a length less than $\lambda/(4n)$, or by a length equal to $\lambda/8n$, where $\lambda$ represents the wavelength of the light reflected by the entrance face, and n represents the refractive index of a medium transmitting the light.

Alternatively, the entrance face is recessed at the core with an end face of the core being parallel with an end face of the cladding.

According to another aspect of the invention, a method for processing an entrance face of an optical fiber, through which a light beam is to be introduced into the optical fiber is provided.

The method includes forming a negative photoresist layer over the entrance face, selectively exposing the photoresist layer located substantially above a core of the optical fiber by light introduced into the optical fiber from another end face thereof, developing the photoresist layer to selectively remove it form an end face of a cladding of the optical fiber, forming a reflection layer on the entrance face, which may have a mirror surface, to enhance the reflectivity of the entrance face, and removing the photoresist layer remaining on the entrance face.

Optionally, the method further includes selectively exposing the photoresist layer above an outer periphery of the end face of the cladding so that an area on the end face of the cladding defined in a vicinity of the core is selectively exposed when the photoresist layer is developed.

Optionally, the reflection layer may be made of metal.

According to another aspect of the invention, the method includes forming a photoresist layer over the entrance face, exposing the photoresist layer located substantially above a core of the optical fiber by light introduced into the optical fiber from another end face thereof, developing the photoresist layer to selectively remove it from one of an end face of the core and an end face of a cladding of the optical fiber, processing the entrance face to diffract the light beam reflected by the entrance face, and removing the photoresist layer remaining on the entrance face.

Optionally, the photoresist layer formed over the entrance face is developed so that the cladding is exposed, and processing the entrance face includes etching the cladding so that the core protrudes from the cladding with the end face of the core being parallel with the end face of the cladding.

Further optionally, the cladding is etched so that the core protrudes from the cladding by a length less than $\lambda/(4n)$, where $\lambda$ represents the wavelength of the light beam reflected by the end face, and n represents a refractive index of a medium transmitting the light. In some particular cases, the core protrudes from the cladding by a length equal to $\lambda/8n$.

In some cases, the photoresist layer formed over the entrance face is developed so that the core is exposed, and processing the entrance face includes forming an additional layer on the entrance face, the additional layer being capable of transmitting the light beam. In this case, the additional layer may have a same refraction index as the core.

In some cases, the photoresist layer formed over the entrance face is developed so that the core is exposed, and processing the entrance face includes etching the core so that the core forms a recessed area on the entrance face and so that the end face of the core is parallel with the end face of the cladding.

In some cases, the photoresist layer formed over the entrance face is developed so that the cladding is exposed, and processing the entrance face includes forming an additional layer on the entrance face so that the core becomes a recessed area on the entrance face.

According to another aspect of the invention, an optical fiber is provided that includes an entrance face that is optically coupleable with a device for transmitting a light beam through said optical fiber. The entrance face has a core region and a cladding region surrounding the core region. The entrance face is arranged so that optical characteristics of the light beam deflected by the entrance face changes from when the light beam impinges on substantially a center of the core region and when the light beam impinges on the entrance face at a location substantially displaced from the center of said core region.

According to still another aspect of the invention, an optical fiber is provided that includes an entrance face that is optically coupleable with a device for transmitting a light beam through said optical fiber. The entrance face is provided with a step having a height less than $\lambda/4n$, where $\lambda$ represents the wavelength of the light beam reflected by the entrance face, and n represents a refractive index of a medium transmitting the light.

BRIEF DESCRIPTION OF THE ACCOMPANYING DRAWINGS

FIG. 1 schematically illustrates a configuration of an optical communication device connected with an optical fiber according to a first embodiment of the invention;

FIG. 2 is a perspective view of a light detector of the optical communication device shown in FIG. 1;

FIGS. 3A and 3B schematically illustrate beam spots formed on a light receiving surface of the light detector shown in FIG. 2;

FIG. 4 schematically shows the optical fiber according to the first embodiment of the invention;

FIGS. 5A through 5E schematically illustrate a process for forming a mirror surface coating on an end face of an optical fiber;

FIG. 6 shows a variation of the optical fiber shown in FIG. 4;

FIG. 7 schematically illustrates a method of exposing an outer periphery of a photoresist formed on an end face of an optical fiber;

Figure 10A:
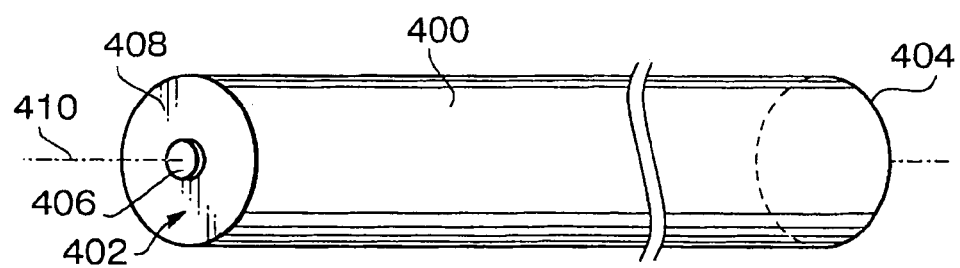
FIG. 10A is a perspective view of an optical fiber according to a second embodiment of the invention.
Figure 10B:
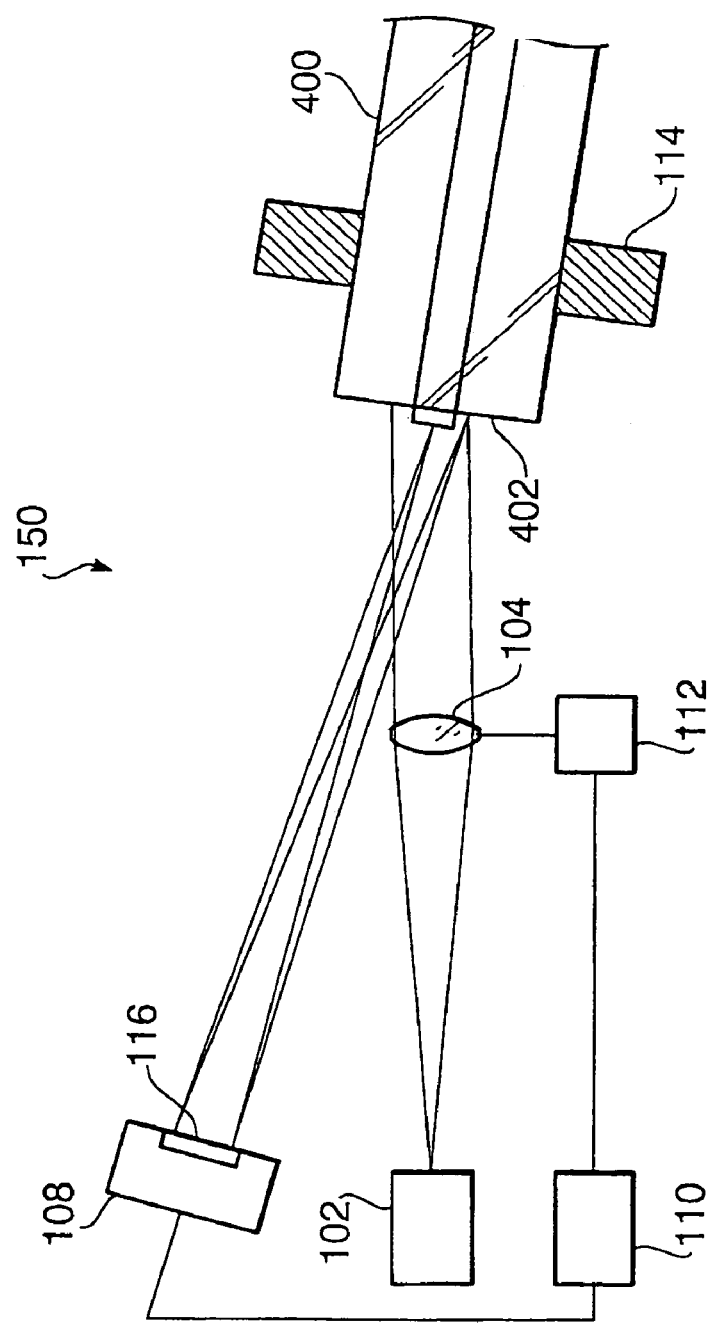
Figure 11A:
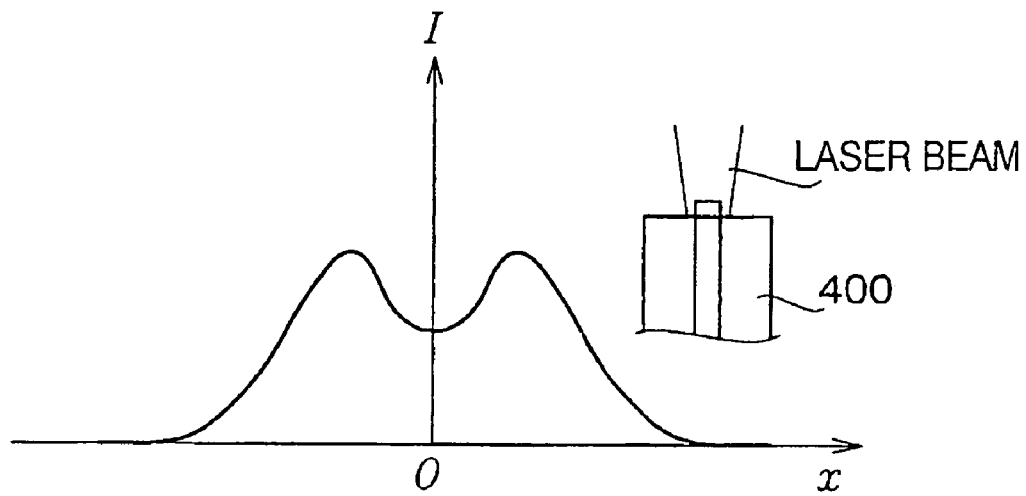
Figure 11B:
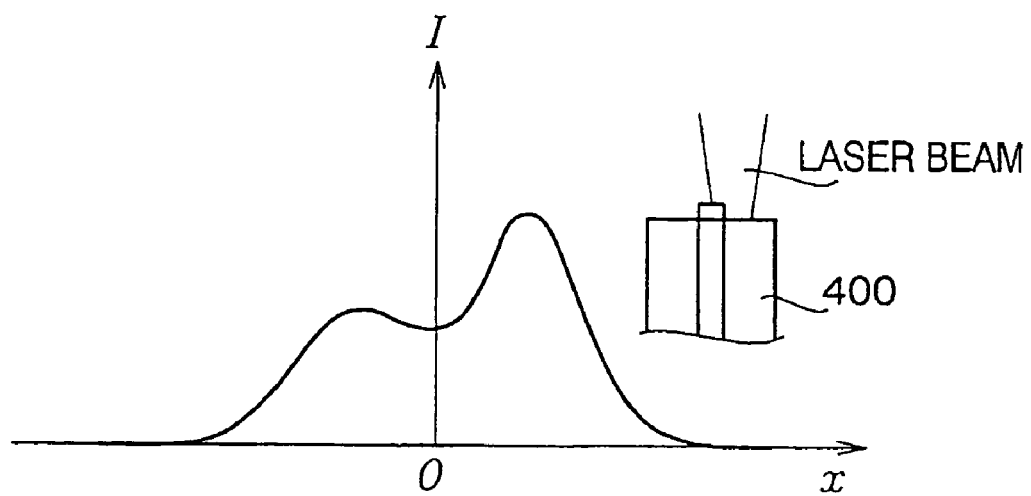
Figure 14:
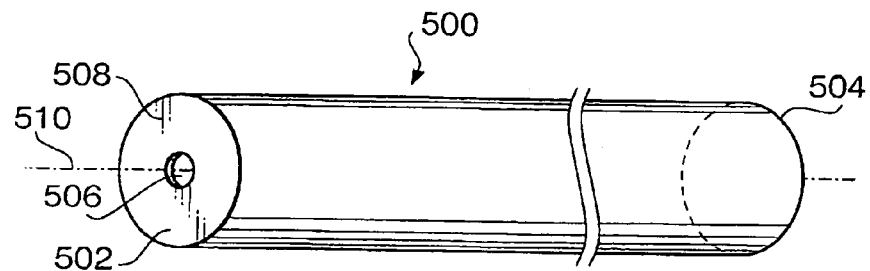
Figure 15A:
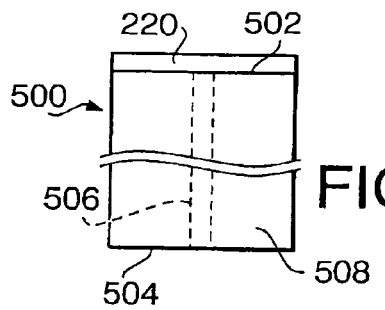
Figure 15C:
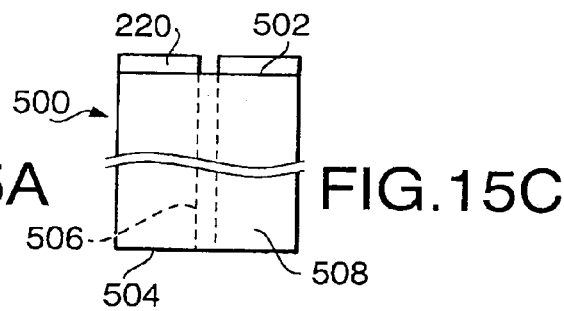
Figure 15B:
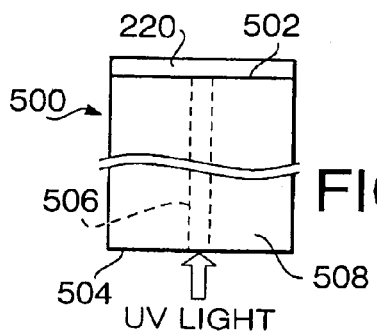
Figure 15D:
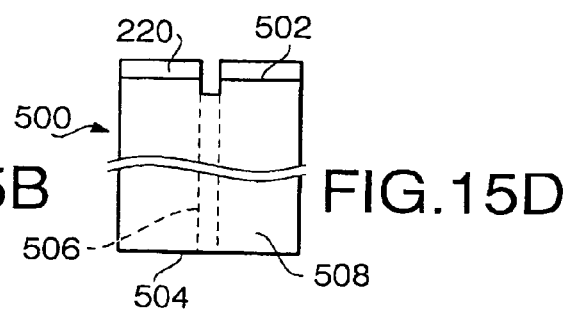
Figure 15E:
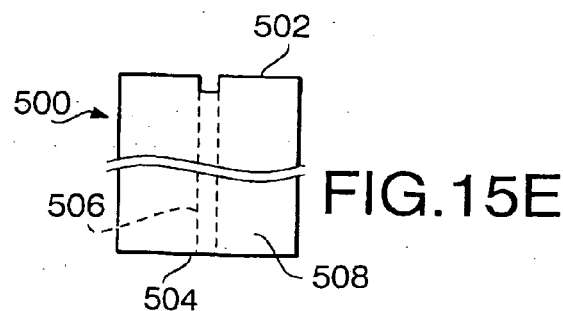
Figure 16:
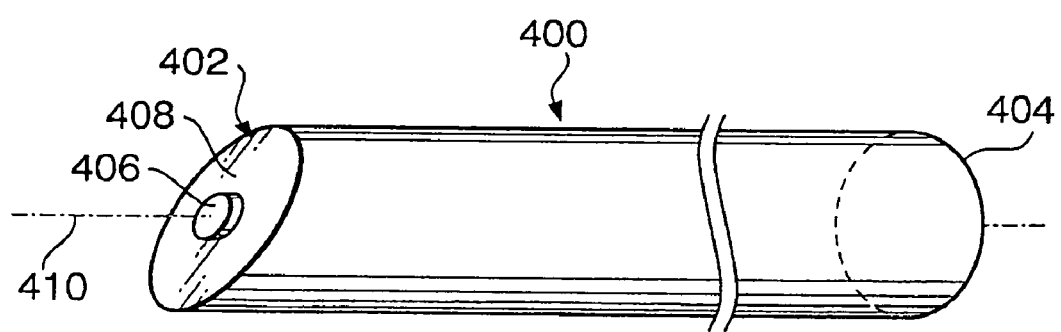

FIG. 10B schematically illustrates a configuration of an optical communication device connected with the optical fiber according to the second embodiment of the invention;

FIGS. 11A and 11B schematically show light intensity distributions of the laser beam impinging on the light receiving area after being reflected by an end face of the optical fiber shown in FIG. 10A;

FIGS. 12A through 12E schematically illustrate a process for forming a protruded core on an end face of an optical fiber;

FIGS. 13A through 13E schematically illustrate another process for forming a protruded core on an end face of an optical fiber;

FIG. 14 shows a variation of the optical fiber shown in FIG. 10A;

FIGS. 15A, through 15E schematically illustrate a process for forming a recessed area on an end face of an optical fiber; and FIG. 16 shows a variation of the optical fiber shown in FIG. 10A.

DETAILED DESCRIPTION OF THE EMBODIMENTS

Hereinafter, embodiments of the present invention will be described with reference to the accompanying drawings, in which elements that are substantially the same are denoted by the same reference numbers.

Figure 1:
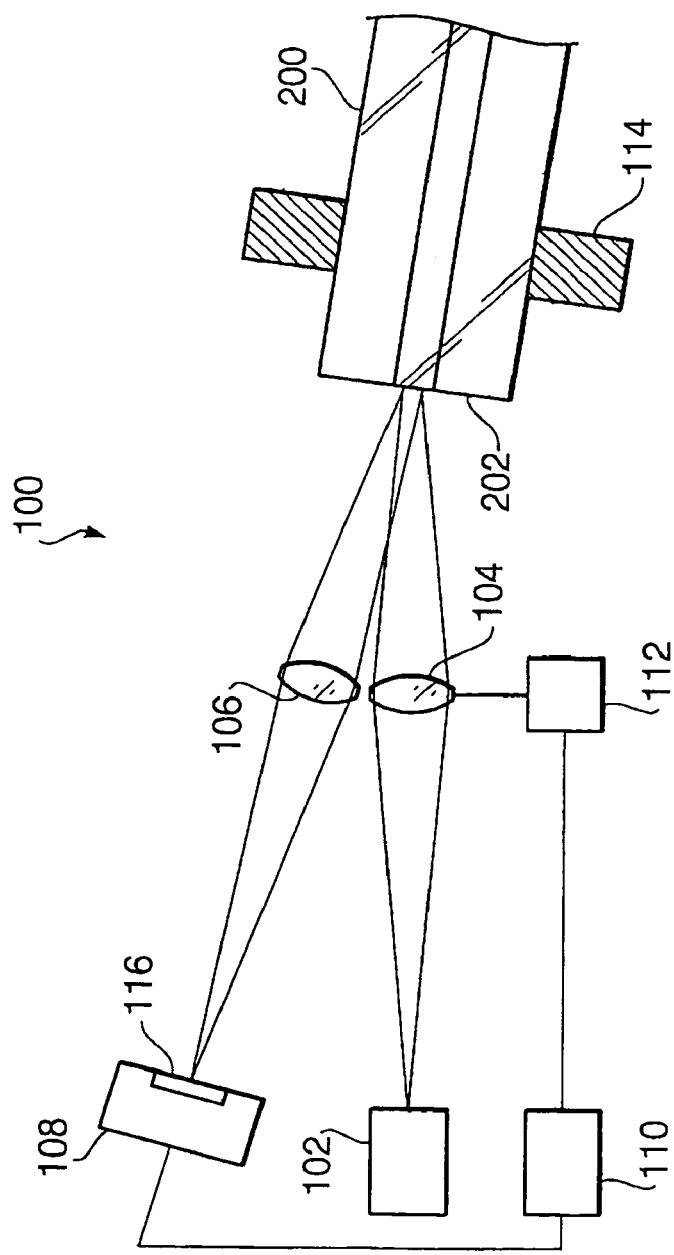

FIG. 1 schematically illustrates a configuration of an optical communication device 100 connected with an optical fiber 200 according to a first embodiment of the invention. The optical communication device 100 is, for example, an optical network unit (ONU) that connects a terminal such as a subscriber's computer with an optical fiber network. The optical communication device 100 is designed, for example, with a wavelength division multiplexing (WDM) technology that transports bi-directional signal over a single optical fiber. The optical communication device 100 utilizes light of which wavelength is 1.3 μm for transmitting data and light of which wavelength is 1.5 μm for receiving data.

As shown in FIG. 1, the optical communication device 100 is provided with a laser diode 102, a first converging lens. 104, a second converging lens 106, a light detector 108, a controller 110 and an actuator 112.

The laser diode 102 is a light source generating the light for data transmission. The laser diode 102 emits a laser beam that is modulated ON/OFF in accordance with data to be transmitted over the optical fiber 200.

The first converging lens 104 is placed on the optical path of the laser beam emitted from the laser diode 102, and converges the laser beam on an end face, or entrance face 202, of the optical fiber 200.

The first converging lens 104 is supported by the actuator 112 movably within a lens position adjustment plane that is perpendicular to an optical axis of the first converging lens 104. The actuator 112 moves the first converging lens 104 within the lens position adjustment plane to adjust an incident position of the laser beam on the entrance face 202 of the optical fiber 200.

A part of the laser beam incident on the entrance face 202 of the optical fiber 200 enters the optical fiber 200 and transmits therethrough to a receiving device, while the remaining part of the laser beam is reflected by the entrance face 202.

The optical fiber 200 is held by a fiber holding mechanism 114 of the optical communication device. 100 so that the laser beam impinges obliquely on the entrance face 202 of the optical fiber 200 and is reflected toward the light detector 108.

The second converging lens 106 is placed between the entrance face 202 of the optical fiber 200 and the light detector 108 so that the entrance face 202 and a light receiving surface 116 of the light detector 108 are conjugate with respect to the second converging lens 106, and so that the center of the entrance face 202 and the center of the light receiving surface 116 are on the optical axis of the second converging lens 106. Accordingly, the laser beam reflected at the center of the entrance face 202 is converged by the second converging lens 106 on the center of the light receiving surface 116, The light detector 108 is a photodiode that detects the light amount of the laser beam incident thereon.

Figure 2:
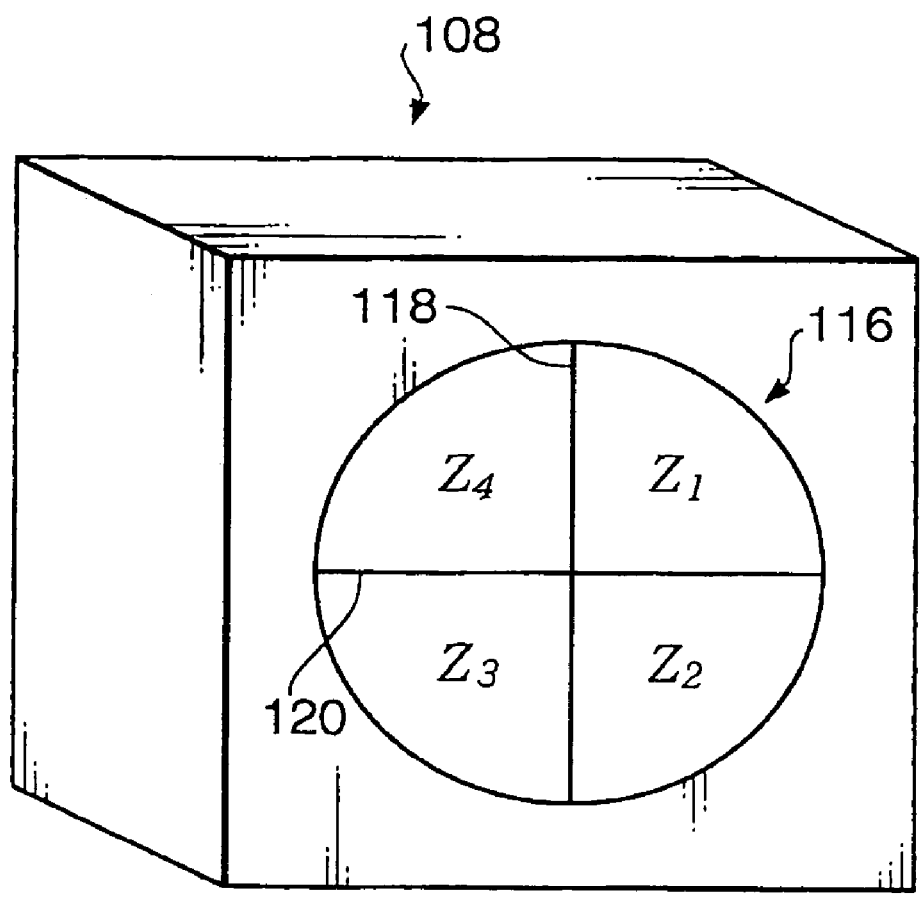

FIG. 2 is a perspective view of the light detector 108. The light receiving surface 116 is divided in four light detecting areas Z1, Z2, Z3, and Z4 by first and second boundary lines 118 and 120. In the present embodiment, the light receiving surface 116 has a round shape. The first and second boundary lines 118 and 120 are orthogonal to each other and pass through the center of the round light receiving surface 116. Accordingly, the light receiving surface 116 is divided into quarters by the first and second boundary lines 118 and 120.

Each light detecting area Z1, Z2, Z3, and Z4 detects the light amount of the laser beam incident thereon. The light detector 108 outputs signals corresponding to light amounts detected by the light detecting areas Z1, Z2, Z3 and Z4. The light amounts detected by the light detecting areas Z1, Z2, Z3 and Z4 represent the position of a beam spot formed by the laser beam on the light receiving surface 116.

Figure 3A:
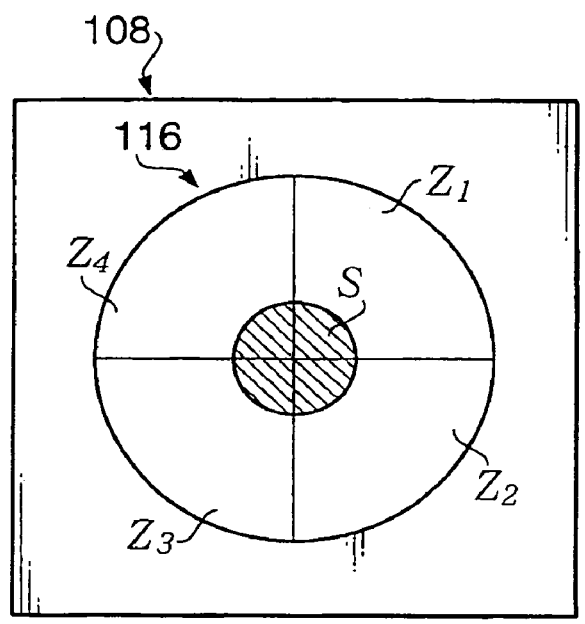
Figure 3B:
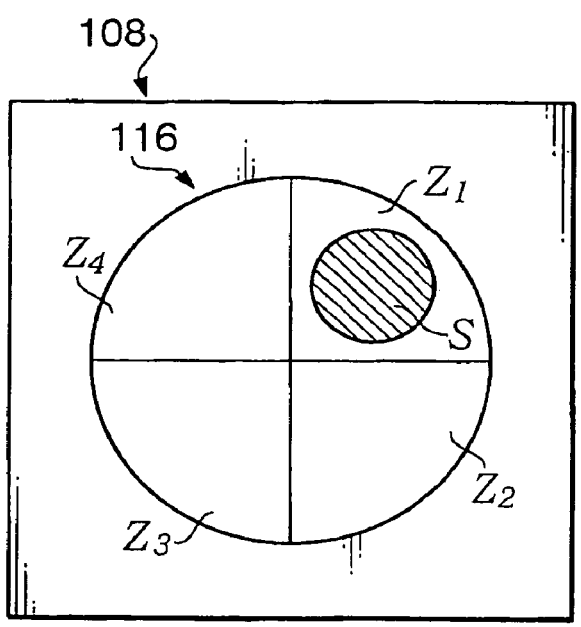

FIGS. 3A and 3B schematically illustrate beam spots formed by the laser beam on the light receiving surface 116 of the light detector 108. FIG. 3A illustrates a beam spot S formed on the center of the light receiving surface 116, while FIG. 3B illustrates a beam spot S formed on a position displaced from the center of the light receiving surface 116. When the beam spot S is formed on the center of the light receiving surface 116 as shown in FIG. 3A, the light amounts detected by the four light detecting areas Z1, Z2, Z3 and Z4 are equal to each other. However, when the beam spot S is displaced from the center of the light receiving surface 116, the light amounts detected by the light detecting areas Z1, Z2, Z3 and Z4 are unequal. For example, in the case shown in FIG. 3B, only the light detecting area Z1 detects light, indicating that the beam spot S is displaced from the center of the light receiving surface 116 and formed only on the light detecting area Z1.

The light detector 108 generates signals corresponding to the light amounts detected by the light detecting areas Z1, Z2, Z3 and Z4 and outputs those signals to the controller. 110. The controller 110 adjusts the incident position of the laser beam on the entrance face 202 of the optical fiber 200 based on the signals received from the light detector 108. This adjustment is carried out by controlling the position of the first converging lens 104 by operating the actuator 112.

As previously mentioned, the second converging lens 106 and the light detector 108 are arranged such that the laser beam reflected by the entrance face 202 of the optical fiber 200 at the center thereof is incident on the center of the light receiving surface 116 of the light detector 108. Therefore, the controller 110 adjusts the incident position of the laser beam on the optical fiber's entrance face 202 so that the laser beam reflected by the entrance face 202 is incident on the center of the light receiving surface 116 of the light detector 108, or so that the light amounts detected by the light detecting areas Z1, Z2, Z3 and Z4 become equal to each other.

It should be noted that the above-mentioned adjustment of the incident position of the laser beam on the optical fiber's entrance face 202 can be carried out not only at the time of tuning-up of the optical communication device 100 after it is connected with the optical fiber 200, but also when the optical communication device 100 is in communication with other devices through the optical fiber 200. In the later case, the laser beam modulated in accordance with data to be transmitted can be utilized for adjusting the incident position of the laser beam on the optical fiber's entrance face 202.

Figure 4:
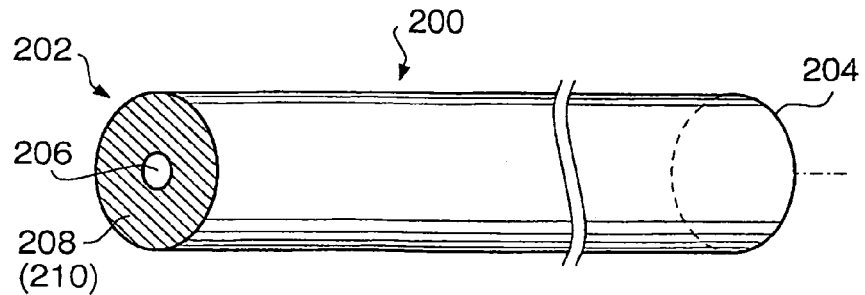

FIG. 4 schematically shows the optical fiber 200 according to the first embodiment of the invention. The optical fiber 200 has the entrance face (first end face) 202 and a second end face 204. The first end face 202 includes a core region 206 and a cladding region 208. The cladding region 208 is provided with a mirror surface coating 210 on the whole area thereof. The mirror surface coating 210 is, for example, a thin layer of metal such as chromium (Cr), gold (Au), or aluminum (Al) formed by means of evaporation, spattering, chemical vapor deposition (CVD), or the like.

The mirror surface coating 210 enhances the reflectivity of the cladding region 208. The laser beam incident on the cladding region 208 is therefore effectively reflected toward the light detector 108 and allows the light detecting areas Z1, Z2, Z3, and Z4 to accurately measure the light amount of the reflected laser beam. The accurate measurements of the light detecting areas Z1, Z2, Z3, and Z4 allow, in turn, the controller 110 to accurately adjust the incident position of the laser beam on the optical fiber's entrance face 202.

By a conventional optical fiber not provided with a mirror surface coating on an end face thereof, the reflectivity of the end face is very low and the power of the light reflected thereby is very low. Therefore, the optical communication device 100 can hardly adjust the incident position of the laser beam on the end face of the conventional optical fiber. The optical fiber 200 shown in FIG. 4 overcomes this problem of the conventional optical fiber and allows the optical communication device 100 to establish good optical coupling between the laser diode 102 and the optical fiber 200.

FIGS. 5A through 5E schematically illustrate a process for forming the mirror surface coating 210 on the first end face (entrance face) 202 of the optical fiber 200.

Figure 5A:
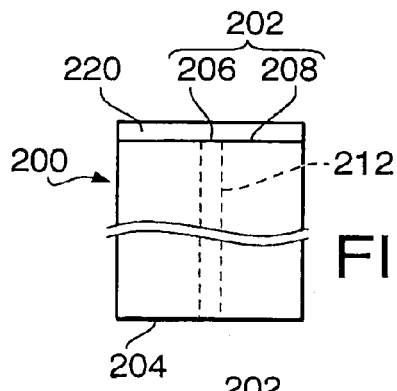

First, a negative photoresist is applied on the first end face 202 of the optical fiber 200 over the whole area thereof to form a photoresist layer 220 (see FIG. 5A). The photoresist is applied, for example, by utilizing a spin coater. Alternatively, the first end face. 202 may be coated with the photoresist by spraying the photoresist thereon.

Figure 5C:
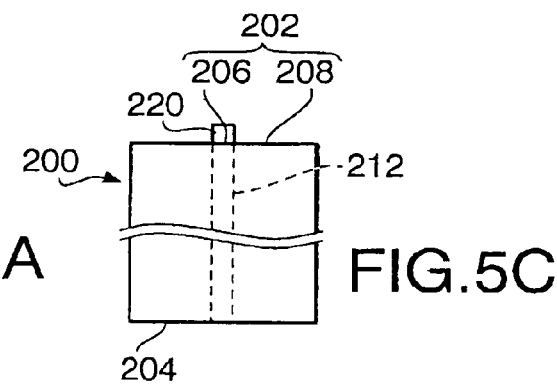
Figure 5B:
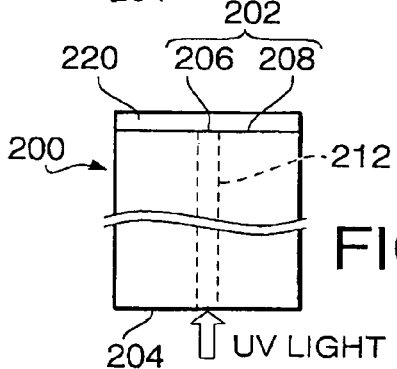

Next, ultraviolet light is introduced into the optical fiber 200 from the second end face 204 thereof as shown in FIG. 5B. The ultraviolet light passes through the optical fiber 200 and emerges from the core region 206 of the first end face 202. Thus, the photoresist layer 220 is selectively exposed only at above the core region 206. Note that the exposure time depends on the thickness of the photoresist layer.

The exposure process described above allows selective exposure of the photoresist layer 220 without using a mask. Therefore, the exposure process is simple and can be carried out at low cost.

After the exposure process shown in FIG. 5B, the photoresist layer 220 is developed to remove the photoresist not exposed, or the photoresist applied on the cladding region 208 of the first end face 202. As a result, the photoresist layer remains only above the core region 206 as shown in FIG. 5C.

Figure 5D:
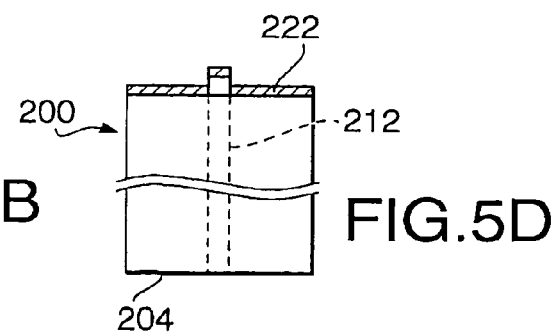

Next, as shown in FIG. 5D, a thin layer 222 having an uniform thickness and a high reflectivity is formed on the first end face 202. In the present embodiment the thin layer 222 is a mirror surface metal layer formed by means of evaporation. The metal that can be used for forming the thin layer 222 includes chromium, gold and aluminum. It should be noted that materials other than metal can be also used if the obtained thin layer 222 has a reflectivity higher than the cladding region 208.

Figure 5E:
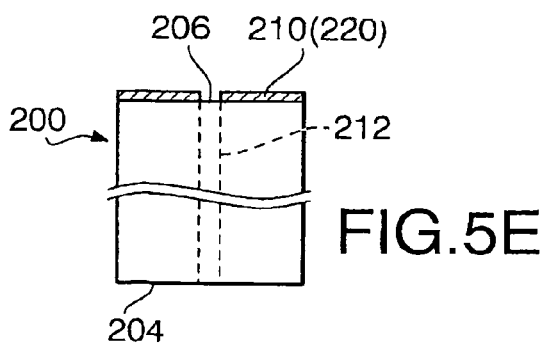

Next, lift off is performed (see FIG. 5E). That is, the photoresist layer 220 remaining on the core region 206 is removed from the first end face 202 together with the thin (metal) layer 222 thereon to expose the core region 206. The lift off is performed by dipping the first end face 202 into acetone, for example. As a result, the thin (metal) layer 222 remains only on the cladding region 208 and forms the mirror surface coating 210 shown in FIG. 4. Note that, since the object of the mirror surface coating 210 is to increase the light amount reflected by cladding region 208, the mirror surface coating 210 is only formed on the cladding region 208 and not on the circumferential side surface of the optical fiber 200.

Figure 6:
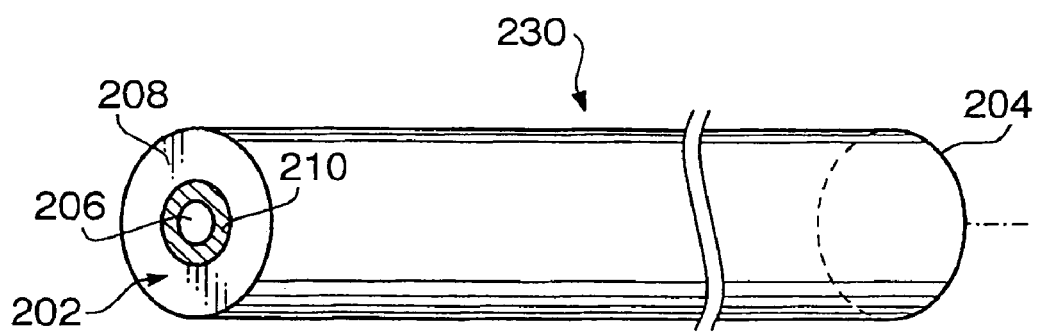

FIG. 6 shows a variation of the optical fiber 200 shown in FIG. 4. The optical fiber 230 shown in FIG. 6 differs from the optical fiber 200 shown in FIG. 4 in that the mirror surface coating 210 is formed on the cladding region 208 of the first end face 202 only in a vicinity of the core region 206. Except the above, the optical fiber 230 has the same configuration as the optical fiber 200.

Figure 7:
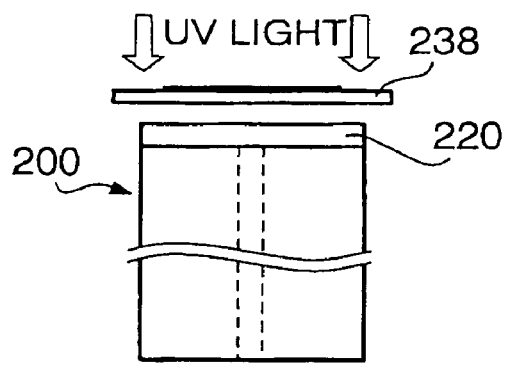

The optical fiber 230 shown in FIG. 6 can be used instead of the optical fiber 200 shown in FIG. 4 when the light detector 108 of the optical communication device 100 has a high sensitivity. Note that the optical fiber 230 can be produced by carrying out an additional exposure process between the exposure process shown in FIG. 5B and the developing process shown in FIG. 5C, in which the outer peripheral area of the photoresist layer 220 is selectively exposed by ultraviolet light irradiated on the first end face 202 through a mask 238 as shown in FIG. 7.

Figure 8:
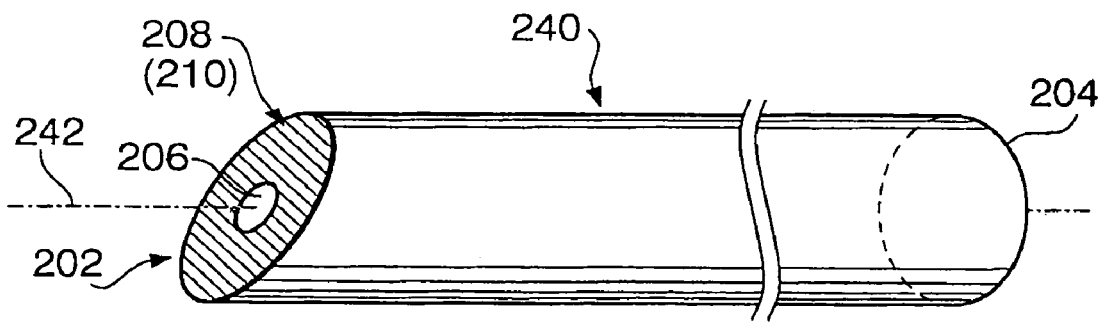
FIG. 8 shows another variation of the optical fiber shown in FIG. 4.

FIG. 8 shows another variation of the optical fiber 200 shown in FIG. 4. The optical fiber 240 shown in FIG. 8 differs from the optical fiber 200 shown in FIG. 4 in that the first end face 202 is formed so that it inclines against an optical axis 242 of the optical fiber 240. Except the above, the optical fiber 240 has the same configuration as the optical fiber 200. It should be noted that the optical fiber 240 can be produced by obliquely cutting one end of the optical fiber 240 to form an oblique first end face, and then carrying out the process described in connection with FIGS. 5A through 5E.

Figure 9:
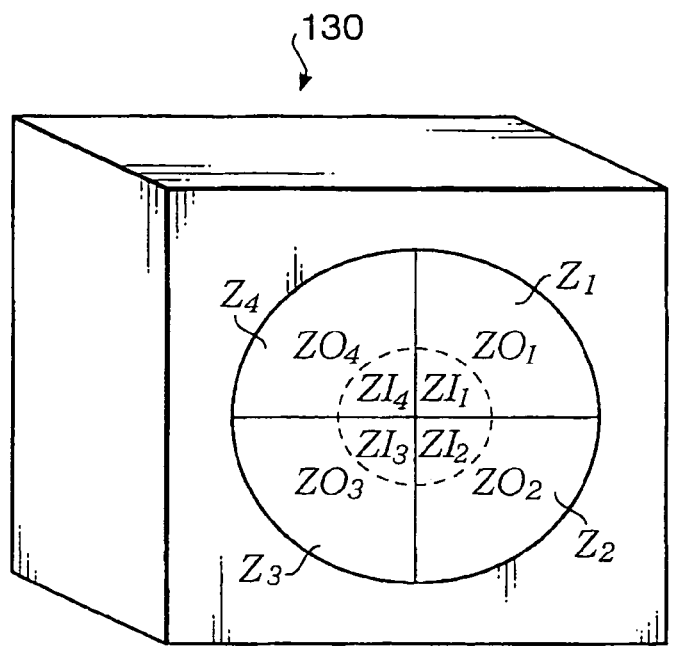
FIG. 9 shows a variation of the light detector shown in FIG. 2.

FIG. 9 shows a variation of the light detector 108 shown in FIG. 2. The light detector 130 shown in FIG. 9 differs from the light detector 108 shown in FIG. 2 in that each light detecting area $Z_i$ (i=1, 2, 3, 4) thereof has an inner zone $ZI_i$ and an outer zone $ZO_i$. The inner zones $ZI_j$ and the outer zones $ZO_1$ are arranged such that the laser beam reflected by the core region 206 of the entrance face 202 of the optical fiber 200 impinges on the inner zones $ZI_i$ and the laser beam reflected by the cladding region 208, or mirror surface coating 210, impinges on the outer zones $ZO_1$. Each of the light detecting areas $Z_i$ is arranged to have a higher sensitivity at the inner zone $ZI_i$ than at the outer zone $ZO_i$ so that the light beam reflected by the core region 206, which has a lower reflectivity than the cladding region 208, can be also detected accurately.

FIG. 10A is a perspective view of the optical fiber 400 according to the second embodiment of the invention. The optical fiber 400 has a first end face (entrance face) 402 and a second end face 404. The optical fiber 400 also has a core 406 and a cladding 408 surrounding the core 406.

FIG. 10B schematically illustrates an optical communication device 150 which has the same configuration as the optical communication device 100 shown in FIG. 1 except that the second converging lens 106 is removed. The optical fiber 400 is connected with the optical communication device 150 at the first end face 402, as shown in FIG. 10B, so that the laser beam emitted from the laser diode 102 is converged on the first end face 402 of the optical fiber 400 with a diameter greater than that of the core 406. A part of the laser beam is introduced into the optical fiber 400, while the remaining part thereof is reflected toward the light detector 108 by the first end face 402 of the optical fiber 400.

The first end face 402 of the optical fiber 400 is formed so that diffraction occurs when the laser beam incident thereon is simultaneously reflected by the core 406 and the cladding 408. More specifically, the first end face 402 is formed so that the core 406 protrudes from the cladding 408 in a direction of an optical axis 410 of the optical fiber 400 with the end face of the core 406 being parallel with the end face of the cladding 408. The core 406 is protruded from the cladding 408 by a distance less that $\lambda/(4n)$ where $\lambda$ represents the wavelength of the laser beam and n represents the refractive index of the medium transmitting the laser beam. In the present embodiment, the core 406 protrudes from the cladding 408 by a distance of $\lambda/8n$ (or $\lambda/8$ since the medium transmitting the laser beam is air). The first end face 402 of the optical fiber 400 arranged as above diffracts the laser beam reflected thereby.

FIGS. 11A and 11B schematically show light intensity distributions of the laser beam impinging on the light receiving area 116 after being reflected by the first end face 402 of the optical fiber 400 shown in FIG. 10A. In each of FIGS. 11A and 11B, the vertical line represents the light intensity I and the horizontal line represents the distance x from the center of the light receiving area 116. FIG. 11A schematically shows the light intensity distribution of the laser beam reflected by the first end face 402 at the center area thereof, and. FIG. 11B schematically shows the light intensity distribution of the laser beam reflected by the first end face 402 at an area thereof displaced from the center.

As shown in FIG. 11A, when the laser beam is reflected by the optical fiber's first end face 402 at the center area thereof, the light intensity distribution has, for example, double peaks due to the diffraction of the reflected laser beam and is symmetrical with respect to the center of the light receiving surface 116 of the light detector 108.

The light intensity distribution, however, becomes asymmetric with respect to the center of the light receiving surface 116 when the laser beam is reflected by the optical fiber's first end face 402 at an area thereof displaced from the center. Due to the diffraction of the reflected laser beam, the level of one of the peaks in the light intensity distribution increases compared to the peak value of the light intensity distribution shown in FIG. 1A. The asymmetric distribution and the high peak value of the light intensity distribution shown in FIG. 11B makes the differences between the light amounts detected by the light detecting areas Z1, Z2, Z3, and Z4 of the light detector 108 large and thereby facilitates the light detector 108 detecting the displacement of the laser beam incident position on the first end face 402 of the optical fiber 400 from the center thereof.

FIGS. 12A through 12E schematically illustrate a process for forming the protruded core 406 on the first end face 402 of the optical fiber 400.

Figure 12A:
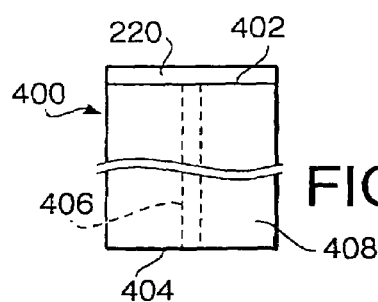

First, a negative photoresist is applied on the first end face 402 of the optical fiber 400 over the whole area thereof to form a photoresist layer 220 (see FIG. 12A).

Figure 12C:
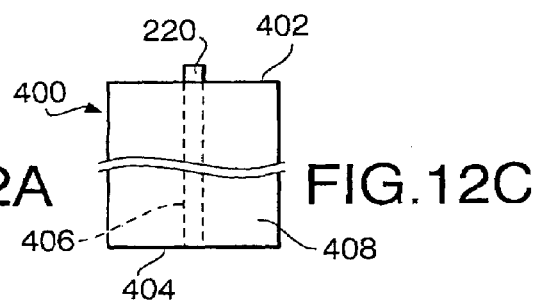
Figure 12B:
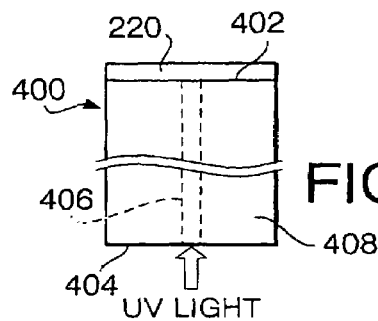

Next, ultraviolet light is introduced into the optical fiber 400 from the second end face 404 thereof as shown in FIG. 12B. The ultraviolet light transmits through the core 406 and emerges from the first end face 402. As a result, the photoresist layer 220 above the core 406 is selectively exposed by the ultraviolet light.

Next, the photoresist layer 220 is developed to remove the photoresist not exposed, i.e. the photoresist on the cladding 408. After the development, the photoresist layer remains only above the core 406 as shown in FIG. 12C.

Figure 12D:
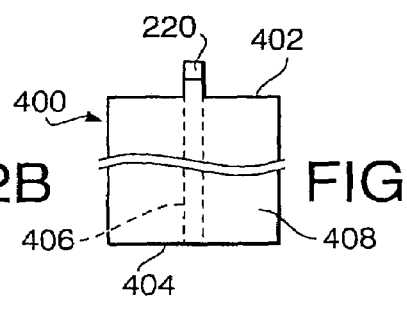

Next, the first end face 402 is etched (see FIG. 12D). Since the core 406 is protected by the photoresist layer 220, only the cladding 408 is selectively etched. The cladding 408 is etched until the step height between the core 406 and the cladding 408 becomes $\lambda/8$. Either wet etching or dry etching may be utilized. In the present embodiment, the dry etching is employed since the etching speed thereof can be precisely controlled. More particularly, a fast atom beam device is utilized in the present embodiment for etching the cladding 408, which performs excellent anisotropic etching.

Figure 12E:
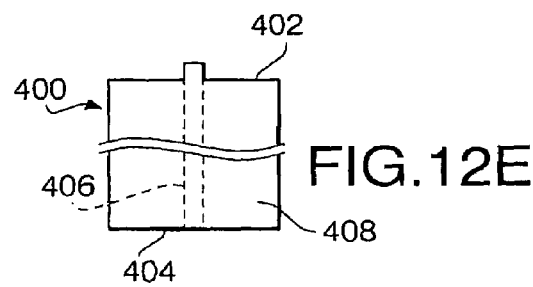

After the etching process is carried out, the photoresist layer 220 remaining on the core 406 is removed, as shown in FIG. 12E, to ultimately obtain the optical fiber 400 shown in FIG. 11.

FIGS. 13A through 13E schematically illustrate another process for forming the protruded core 406 on the first end face 402 of the optical fiber 400.

In the process shown in FIGS. 13A through 13E, the steps of forming a photoresist layer 220 on the first end face 402 of the optical fiber 400 (FIG. 13A), exposing the photoresist layer 220 (FIG. 13B), and developing the photoresist layer 220 (FIG. 13C) are the same as the steps described above in connection with FIGS. 12A, 12B and 12C, respectively, except that a positive type photoresist is applied on the first end face 402. Thus, after the development, the photoresist layer 220 on the cladding 408 remains and the core 406 is exposed (see FIG. 13C).

After the development of the photoresist layer 220, an additional layer 412 having a thickness of $\lambda/8$ is formed on the first end face 402 (see FIG. 13D). The additional layer 412' is made of a material through which the laser beam can transmit. Preferably, the material has the same refractive index as the core 406 of the optical fiber 400. An example of such a material is glass ($SiO_2$). The additional layer 412 can be formed by spattering, for example.

Next, the photoresist layer 220 is removed together with the additional layer 412 formed thereon. As a result, the additional layer 412 remains only on the core 406, as shown in FIG. 13E, and the optical fiber 400 shown in FIG. 10A is obtained.

FIG. 14 shows the optical fiber 500, which is a variation of the optical fiber 400 shown in FIG. 10A. The optical fiber 500 shown in FIG. 14 has a first end face (entrance face) 502 and a second end face 504. Further, the optical fiber 500 has a core 506 and a cladding 508 surrounding the core 506. As with the optical fiber 400, the optical fiber 500 can be connected to the optical communication device 150 at the first end face 502 thereof.

The first end face 502 of the optical fiber 500 is arranged so that the core 506 forms a recessed area on the first end face 502 (i.e., the core 506 is retracted from the end face of the cladding 508 in a direction of an optical axis 510 of the optical fiber 500), and so that the end face of the core 506 is formed parallel to the end face of the cladding 508. The depth of the recessed area formed by the core 506 is less than $\lambda/4n$, and is equal to $\lambda/8$ in the present embodiment.

The optical fiber 500 arranged as above causes the laser beam reflected by the first end face 502 thereof to diffract in a similar manner as the laser beam reflected by the first end face 402 of the optical fiber 400 shown in FIG. 10A.

FIGS. 15A through 15E schematically illustrate a process for forming the recessed area mentioned-above on the first end face 502 of the optical fiber 500.

In the process shown in FIGS. 15A through 15E, the steps of forming a photoresist layer 220 on the first end face 502 of the optical fiber 500 (FIG. 15A), exposing the photoresist layer 220 (FIG. 15B), and developing the photoresist layer 220 (FIG. 15C) are the same as the steps shown in FIGS. 13A, 13B and 13C. Therefore, detailed descriptions of these steps will be omitted.

After the photoresist layer 220 is developed to expose the core 506, the first end face 502 is etched. Since the cladding 508 is protected by the photoresist layer 220, the core 506 can be selectively etched during this step. The etching of the first end face 502 is performed until the step height between the core 506 and the cladding 508 at the first end face 502 becomes equal to $\lambda/8$ (see FIG. 15D).

Then, the photoresist layer 220 is removed from the first end face 502 (see FIG. 15E). As a result, the optical fiber 500 shown in FIG. 14 is obtained.

It should be noted that the optical fiber 500 can also be obtained by selectively forming an additional layer on the cladding 508 of the first end face 502, which additional layer is capable of reflecting the laser beam and has a thickness less than $\lambda/4$, by a process similar to that described in FIGS. 5A through 5E.

While the invention has been described in detail with reference to specific embodiments thereof, it would be apparent to those skilled in the art that various changes and modifications may be made therein without departing from the spirit of the invention, the scope of which is defined by the attached claims.

For example, the first end face 402 of the optical fiber 400 shown in FIG. 10A may be formed so that the core 406 protrudes from the cladding 408 in the direction of the optical axis 416 of the optical fiber 400 with the end faces of the core 406 and the cladding 408 inclined against the optical axis 410 as shown in FIG. 16. Note that such an oblique first end face can be produced by obliquely cutting one end of the optical fiber and then carrying out the process described connection with FIGS. 12A through 12E, for example.

The present disclosure relates to the subject matters contained in Japanese Patent Applications Nos. P2002-320864, filed on Nov. 5, 2002, P2002-323494, filed on Nov. 7, 2002; and P2002-327996, filed on Nov. 12, 2002, which are expressly incorporated herein by reference in their entireties.

What is claimed is:

1. An optical fiber, comprising:
   a core and a cladding;
   an entrance face that is optically coupleable with a device for transmitting a light beam through said optical fiber, said entrance face being configured such that said core protrudes from said cladding, an end face of said core being parallel with an end face of said cladding,
   wherein said entrance face is provided with a structure that diffracts a light beam reflected by said entrance face.

2. The optical fiber according to claim 1, wherein said core protrudes from said cladding by a length less than $\lambda/(4n)$, where $\lambda 0$ represents the wavelength of the light reflected by said entrance face, and n represents the refractive index of a medium transmitting the light.

3. The optical fiber according to claim 2, wherein said core protrudes from said cladding by a length equal to $\lambda/8n$.

4. An optical fiber, comprising:
   a core and a cladding;
   an entrance face that is optically coupleable with a device for transmitting a light beam through said optical fiber, said entrance face being recessed at said core with an end face of said core being parallel with an end face of said cladding,
   wherein said entrance face is provided with a structure that diffracts a light beam reflected by said entrance face.

5. An optical fiber, comprising,
   an entrance face that is optically coupleable with a device for transmitting a light beam through said optical fiber, wherein said entrance face is provided with a step having a height less than $\lambda/4n$, where $\lambda$ represents the wavelength of the light beam reflected by said entrance face, and n represents a refractive index of a medium transmitting the light.

6. The optical fiber according to claim 4, wherein said core protrudes from said cladding by a length less than $\lambda/(4n)$, where $\lambda$ represents the wavelength of the light reflected by said entrance face, and n represents the refractive index of a medium transmitting the light.

7. The optical fiber according to claim 6, wherein said core protrudes from said cladding by a length equal to $\lambda/8n$.

8. The optical fiber according to claim 1, wherein said cladding is at least partially covered with a coating that enhances the reflectivity of said entrance face.

9. The optical fiber according to claim 8, wherein said coating is formed substantially over a whole area of said cladding.

10. The optical fiber according to claim 8, wherein said coating is selectively formed on an area of said cladding defined in a vicinity of said core.

11. The optical fiber according to claim 8, wherein said coating is made of metal.

12. The optical fiber according to claim 8, wherein said coating has a mirror surface.

13. The optical fiber according to claim 8, wherein said entrance face is perpendicular to an optical axis of said optical fiber.

14. The optical fiber according to claim 4, wherein said cladding is at least partially covered with a coating that enhances the reflectivity of said entrance face.

15. The optical fiber according to claim 14, wherein said coating is formed substantially over a whole area of said cladding.

16. The optical fiber according to claim 14, wherein said coating is selectively formed on an area of said cladding defined in a vicinity of said core.

17. The optical fiber according to claim 14, wherein said coating is made of metal.

18. The optical fiber according to claim 14, wherein said coating has a mirror surface.

19. The optical fiber according to claim 14, wherein said entrance face is perpendicular to an optical axis of said optical fiber.

* * * * *